C. D. CALDWELL.
ARTIFICIAL FLY FISH HOOK.
APPLICATION FILED DEC. 8, 1908.

919,820. Patented Apr. 27, 1909.

Witnesses
J. T. L. Wright.
J. W. Garner

Inventor
Charley D. Caldwell,
By Victor J. Evans,
Attorney

UNITED STATES PATENT OFFICE.

CHARLEY D. CALDWELL, OF PARIS, TEXAS.

ARTIFICIAL-FLY FISH-HOOK.

No. 919,820.　　　　Specification of Letters Patent.　　　　Patented April 27, 1909.

Application filed December 8, 1908. Serial No. 466,526.

*To all whom it may concern:*

Be it known that I, CHARLEY D. CALDWELL, a citizen of the United States, residing at Paris, in the county of Lamar and State of Texas, have invented new and useful Improvements in Artificial-Fly Fish-Hooks, of which the following is a specification.

This invention is an improved fly for use in fly fishing or casting, the object of the invention being to provide a fly with a pair of hooks turned in substantially opposite directions to insure the proper "hanging" of the fish on "strike," as hereinafter described and claimed.

Figure 1:
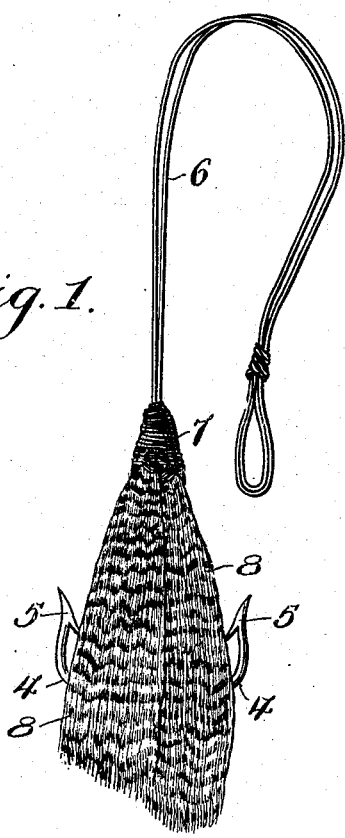
Figure 2:
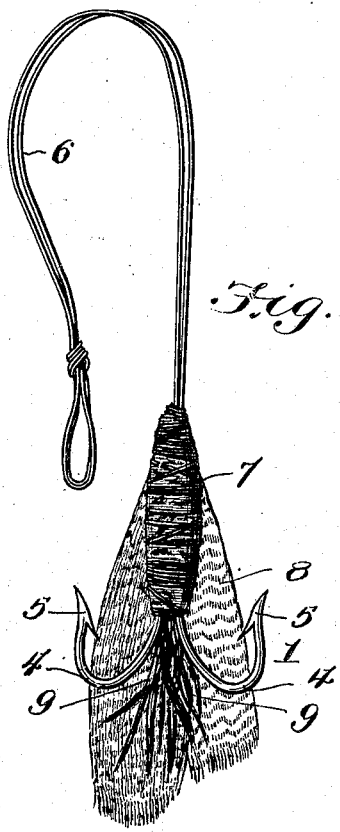
Figure 3:
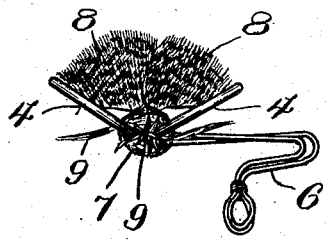
Figure 4:
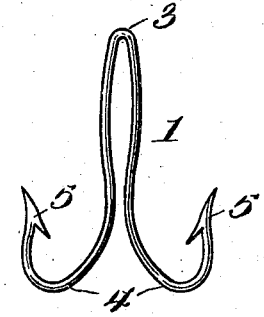

In the accompanying drawings:—Figure 1 is a perspective of a fly constructed in accordance with my invention. Fig. 2 is a similar view showing the opposite or underside. Fig. 3 is a lower end view of the same. Fig. 4 is a detail elevation of the twin hook employed in the making of my improved fly.

The basis of my improved fly is a twin hook 1 made of a single piece of material bent as shown in Fig. 4 to provide the two stems, two of the hooks connecting portion 3 between them at their upper ends and the bills 4 of the hooks, which bills are disposed at an angle with respect to each other as shown in Fig. 3 and extend substantially in opposite directions, the barbs 5 of the hooks being turned toward each other. The snell 6 is attached to the stems of the twin hooks and the body of the fly is formed by silken or other suitable threads wound on the stems of the twin hook and so as to also engage the snell as shown, the body of the fly being indicated at 7. The feathers 8 which simulate the wings of a fly or moth are attached at their upper ends to the body 7 of the fly by the windings of the threads. Underfeathers 9, which may be of any desired color, have their upper portions secured between the stems of the twin hook by the windings which constitute the body of the fly, the lower portions of said feathers projecting from between the hooks as shown in Fig. 2. It will be observed by reference to Fig. 3 that the outer or wing feathers 8 lie in the angle between the hooks and tend to conceal the hooks and their barbs.

When a fish takes a fly, one or both of the hooks become embedded on the "strike" and a fish is prevented from escaping.

What is claimed is:—

A fly of the class described comprising a twin hook having its stems connected at their upper ends, a body formed by a thread wound on the stems of said twin hook, a snell engaged by certain of the windings of the thread, wing feathers engaged at their upper ends by certain of the windings of the thread and an underfeather disposed between the bill of the twin hook and with its upper end portion between the stems of the twin hook and also engaged by certain of the windings of the body thread.

In testimony whereof I affix my signature in presence of two witnesses.

CHARLEY D. CALDWELL.

Witnesses:
　　F. W. COFFEY,
　　W. H. RUSH.